United States Patent [19]

Hicks

[11] Patent Number: 4,481,812
[45] Date of Patent: Nov. 13, 1984

[54] INTERNAL GATE ROTARY VANE FLUID METER WITH CONTROLLED ROTOR VANE ASPECT RATIO

[75] Inventor: Irwin A. Hicks, Radnor, Pa.

[73] Assignee: The Singer Company, Stamford, Conn.

[21] Appl. No.: 494,207

[22] Filed: May 13, 1983

[51] Int. Cl.³ .............................................. G01F 3/08
[52] U.S. Cl. ..................................................... 73/253
[58] Field of Search ................ 73/253, 254, 257, 261; 418/169, 170

[56] References Cited

U.S. PATENT DOCUMENTS

| | | | |
|---|---|---|---|
| 1,994,397 | 3/1935 | Loveridge et al. | 418/169 |
| 3,482,446 | 12/1969 | Wrinkle et al. | 418/169 |
| 3,950,990 | 4/1976 | Butcher | 73/253 |
| 4,253,333 | 3/1981 | Schneider | 73/253 |

*Primary Examiner*—Herbert Goldstein
*Attorney, Agent, or Firm*—David L. Davis; Robert E. Smith; Edward L. Bell

[57] ABSTRACT

An internal gate rotary vane fluid meter which has markedly improved performance as a result of precise control over the geometry and dimensions of the rotating elements and the fluid flow path. In particular, the vanes are dimensioned to each have a length no greater than 1.5 times their width.

1 Claim, 31 Drawing Figures

$L_v : d_v = 1.5 : 1$

Pipe I.D. (1:1)

INTERNAL GATE ROTARY VANE FLUID METER WITH CONTROLLED ROTOR VANE ASPECT RATIO

DESCRIPTION

BACKGROUND OF THE INVENTION

This invention relates to fluid meters and, more particularly, to a fluid meter of the internal gate rotary vane type.

Rotary vane-type fluid meters with an internal sealing gate generally exhibit excellent performance characteristics compared to other types of rotary positive displacement meters (such as the lobed impeller or external sealing gate type meters). As a general rule, the reason for better performance is better fluid flow through the meter and lower friction of the moving parts.

However, in attempting to further refine rotary vane-type meters with internal gas sealing, it has been found that existing designs could be improved with new inventions and solutions based on the results of mathematical/computer iterations and simulations, extensive empirical research testing, and experience with current embodiments. It is an object of this invention to improve capacity, reduce turbulence and compressive/suction cycles, reduce the pressure differential for a given rating, improve the fluid flow for minimum restrictions, reduce the effect of friction, and improve stall torque characteristics for such a meter.

Fluid meters have exacting requirements for minimum performance. For a given full capacity rating, a meter must not exceed some standard of maximum pressure drop, or differential, across the meter connections (as this is a measure of its lack of friction and flow impediments). For gaseous rotary meters this standard is presently one inch water column (1/27 psig) at full capacity on natural gas (0.6 S.G.) where the inlet is at seven inches water column (¼ psig) over atmospheric pressure. As some pressure differential would normally occur across a pipe of equal length, connection to connection, such a requirement dictates low friction of mechanism and minimal fluid flow impediments. It follows that designs having lower mechanical friction and fewer flow impediments have a higher capacity and thus more commercial value.

Another measure of fluid meter performance is accuracy of measuring actual volume from low flow rates to capacity. While 100% accuracy is desirable at all flow rates, it is recognized as being impossible. Accordingly, industry standards use a minimum level of performance which allow some deviations in accuracy. In the United States for gaseous rotary meters this standard presently is a band of ±1% around 100% accuracy for flow rates which the meter must meet during many years of operation without calibration, at all rated pressures, and in all conceivable ambient temperatures. Therefore, a meter with minimal friction and fewer flow impediments is more likely to meet accuracy requirements given such operating conditions.

Higher pressure operation frequently requires special considerations in meter design as the change in fluid density can have substantial effects on accuracy of actual fluid flow measurement. Typical solutions are ratings for a specific range of pressures (where gear ratios of output are altered to normalize the accuracy curve within acceptable limits) and flow shaping (such as flow jetting vanes). Such solutions are an engineering compromise which complicates product design, manufacture, and marketing, and are thus to be avoided if possible.

Another measure of fluid meter performance is a term called "rangeability". Rangeability is defined, for gaseous meters, as the ratio of full flow rate divided by that lower flow rate which falls out of the accuracy band of 100% ±1%. Rangeability is expressed as a ratio (such as 20:1 which would mean the meter's accuracy was falling below 99% at 5% of full flow). This performance criteria is a very sensitive measure of the meter's mechanical friction and/or freedom from compression/suction cycles as these cause the rotating components to try to operate slower than the gas velocity, which results in blowby at the seals. Rangeability can also be a measure of the sealing effectiveness (seal blowby at a given differential), but mechanical friction and/or compression/suction cycles cause the increased pressure differential to drive fluids through the seal.

The above concepts are typically charted for clarity for commercial marketing purposes. FIG. 1 illustrates a typical performance chart for a gaseous rotary meter. In FIG. 1, by convention, the highest accuracy values cannot exceed 101% (see Points B and C) and the lowest accuracy values cannot be lower than 99%, including compression frequencies (see Point D) and "boost" or "droop" at full capacity (Point E is a "droop", F is a "boost"). The Rangeability of this example is 20:1 (or 100% ÷ 5%, the point at which the accuracy curve falls below 99%, Point G). Also, the flange-to-flange pressure differential cannot exceed 1.0" $H_2O$ (see Point H) for 7.0" $H_2O$ inlet pressure.

In the example of FIG. 1, a rotary meter having a high operating pressure differential due to mechanical friction or flow impediments would result in the capacity being lowered until the 1.0" $H_2O$ differential were met. A rotary meter with substantial compressive cycles might not even qualify to the standard. A rotary meter with high rotational velocity friction (due to such items as geared gate driving mechanisms, bearings, lubricating baths, and seals), or flow rate related impediments, might have excessive "droop" as to limit capacity. A rotary meter whose accuracy is adversely affected by pressure might not qualify. A rotary meter having high tare friction (and possibly poor sealing) might substantially reduce rangeability.

Accordingly, it is a primary object of this invention to reduce mechanical friction is an internal gate rotary vane fluid meter.

It is another object of this invention to increase driving torque.

It is a further object of this invention to reduce compression/suction cycles of the rotating components.

It is yet another object of this invention to reduce fluid flow impediments.

It is still another object of this invention to reduce the effects of gas density.

SUMMARY OF THE INVENTION

The foregoing and additional objectives are attained in accordance with the principles of this invention by providing a fluid meter having a gate with at least two pockets which rotates at the same velocity as a rotor having the same number of vanes and wherein the vanes are dimensioned to each have a length no greater than 1.5 times their width.

DESCRIPTION OF THE DRAWINGS

The foregoing will be more readily apparent upon reading the following description in conjunction with the drawings in which like elements shown in different figures thereof have the same reference character applied thereto and wherein.

DETAILED DESCRIPTION

Figure 1:
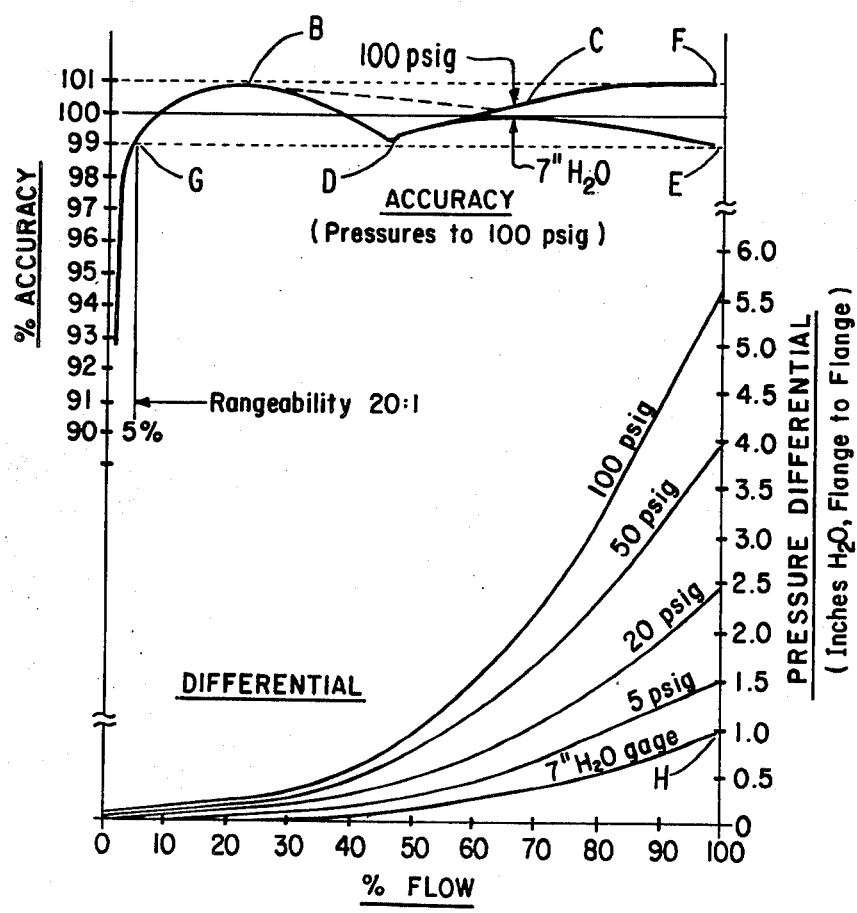
FIG. 1 illustrates a typical performance chart for a rotary gaseous meter.

The design subtleties of this invention make it desirable to first explain the basic principles of a generalized vane-type rotary meter with an internal gate. FIGS. 2A–2F are section views of a contemporary meter showing rotor 10, rotor vanes 11, 12, 13 and 14, gate 30, gate pockets 31 and 32, housing 50, inlet port 51, outlet port 52, and sealing crescent 53. Such construction can be observed in Wrinkle's U.S. Pat. No. 3,482,446 as improved by Schneider's U.S. Pat. No. 4,109,528 and Schneider's U.S. Pat. No. 3,554,032 as improved by Schneider's U.S. Pat. No. 3,842,672. These patents cover the only known commercially available vane-type rotary meters with an internal seal gate.

Figure 2A:
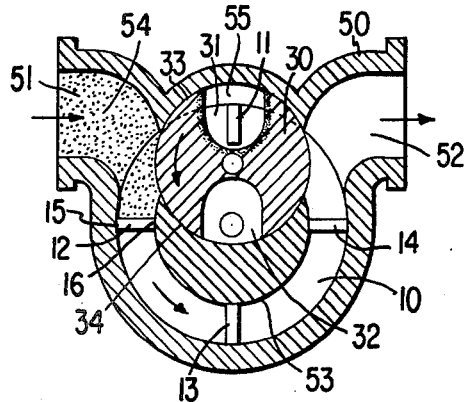
FIGS. 2A–2F are schematic cross sectional views useful in understanding the principles of operation of an internal gate rotary vane fluid meter.

In FIG. 2A, it can be observed that incoming fluid can fill the inlet cavity 54 until stopped by the seal gate 30 and vane 12. The seals on gate 30 are effected against the housing 50 at the gate cavity 55 at the point 33 and against the sealing crescent 53 at the point 34. These seal points 33 and 34 must be sufficiently tight (small clearance) and long enough to substantially impede fluid flow when the outlet port 52 is at a lower pressure than the inlet port 51. The seals on the rotor vane 12 are effected at the housing 50 at the rotor 10 outer diameter at point 15 and at the inner diameter at point 16 against the crescent 53. Again the seal points 15 and 16 must be sufficiently tight and long enough to substantially impede fluid flow.

Figure 2B:
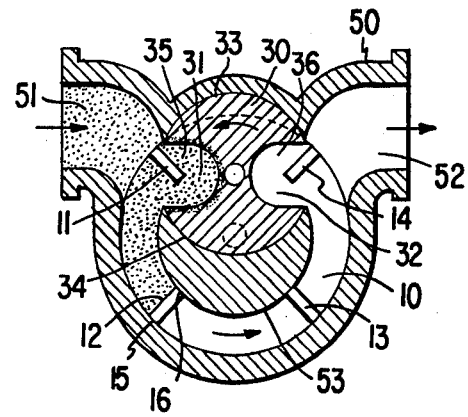

In FIG. 2B, as the vane 12 and rotor 10 are driven counterclockwise (due to pressure differential from inlet to outlet), the gate 30 is also driven counterclockwise (generally by timing gearing) so as to synchronize the gate pocket 31 with the passage of the leaving vane 11 and the gate pocket 32 with the returning vane 14. It should be noted that such a drive to the gate 30 requires some energy from the rotor 10 to overcome gate timing gear (or other) drive friction, to overcome gate bearing friction, and to overcome the compression behind vane 11 and the suction ahead of vane 14 in the gate pocket 31 and 32 designated as points 35 and 36 respectively, due to the higher rotational velocity of the gate 30 compared to the rotor 10. (The compression/suction characteristic may not be obvious and is discussed later.) In this position, the gate 30 seals against the housing 50 at the point 33 and against the crescent 53 at the point 34 while the vane 12 seals at points 15 on its outer diameter and 16 on its inner diameter. The flow of fluid from the inlet port 51 to the outlet port 52 is still sealed.

Figure 2C:
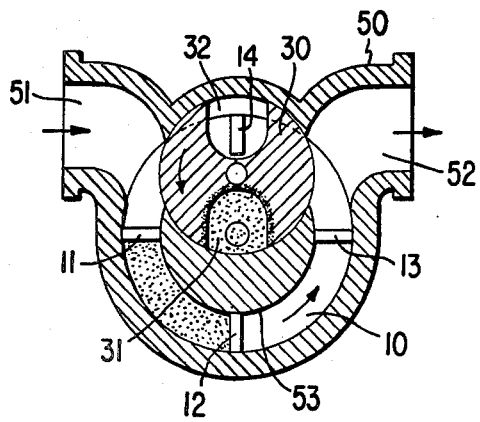
Figure 2D:
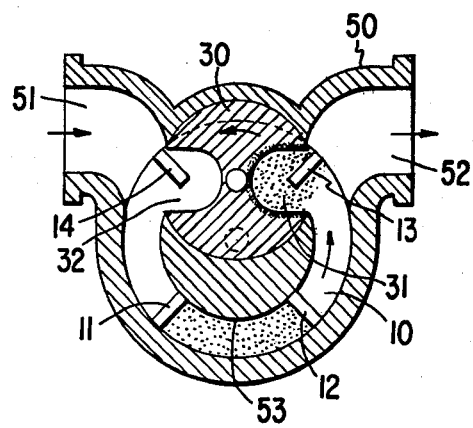
Figure 2E:
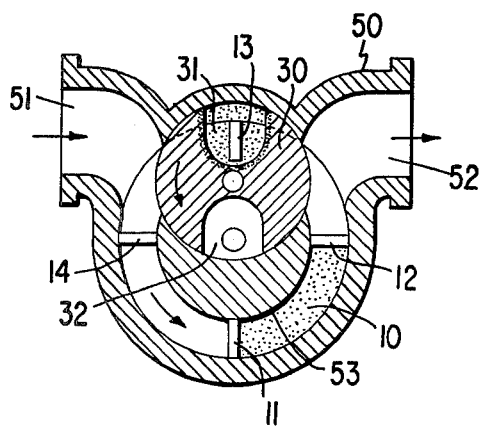
Figure 2F:
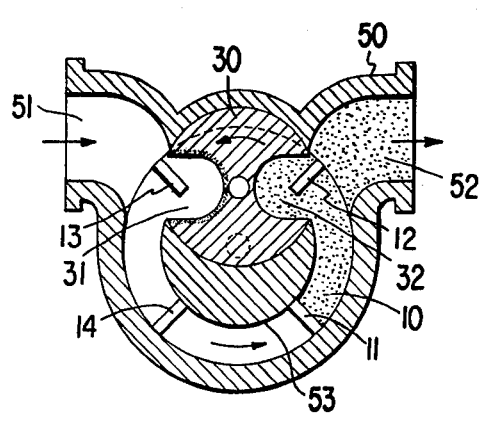

In FIG. 2C, a portion of fluid has now been trapped between vanes 11 and 12 which, for these illustrations, becomes the measured actual volume. In fact, however, the measured volume also includes the gate pocket 31 volume less the returning gate pocket 32 volume, the latter being smaller because of the vane 14 displacement which makes up for half each of vanes 11 and 12 displacement. This is why the capacity of the meter is the swept area of the vanes and ignores the vane thickness. FIGS. 2D–2F continue the cycle until, in FIG. 2F, the measured gas is expelled to the outlet port 52.

In order to discuss the compression/suction phenomenon, there is an observation to be made about the meter design shown in FIGS. 2A–2F. These illustrations show a 2 pocket gate and 4 vane rotor with relative rotational velocities in the ratio of 2 to 4; i.e., the gate 30 rotational velocity is twice (200%) that of the rotor 10. It is well known that any other ratio which synchronizes the vanes into gate pockets will work (but is not necessarily preferred) as long as there are at least two vanes (required for sealing).

At one time or another, just about every gate pocket/rotor vane ratio has been tried. Indeed, some prior patents are founded on the precept of having invented the "right" ratio for minimum compression/suction effect (some patents call this phenomenon "turbulence"). For example, Wrinkle's U.S. Pat. No. 3,482,446 and Butcher's Pat. No. 3,950,990 specifically claim the invention of the "right" ratio. In fact, what was invented was the geometry and rotational velocity ratios of gate and rotor such that the peripheral velocity of the gate closely matched the peripheral velocity of the rotor vanes (which, indeed, does minimize or eliminate compression/suction cycles, or "turbulence", at that peripheral point). These patents typically illustrate a series of gate/rotor radial positions as evidence of the claimed improved performance.

Figure 3:
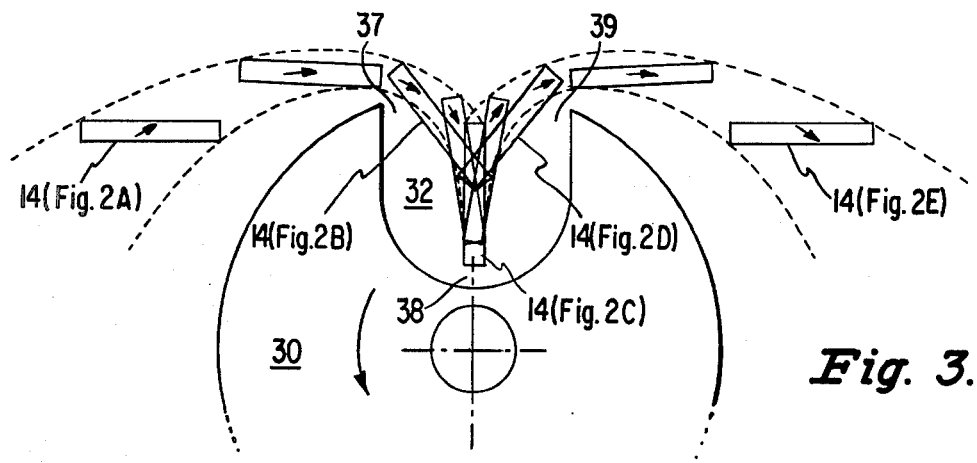
FIGS. 3, 4 and 5 illustrate the passage of a vane through a pocket from the perspective of a pocket which is stationary relative to the viewer.
Figure 4:
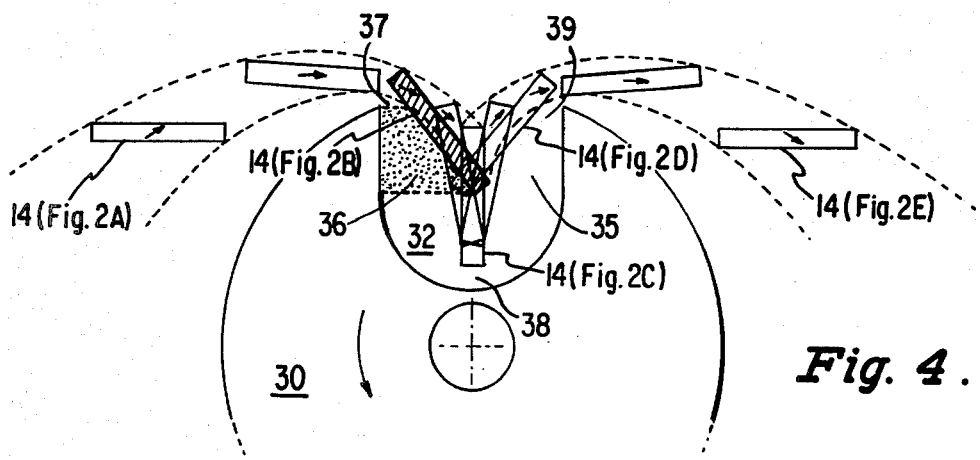

However, by utilizing computer iteration techniques, there is now a more visual tool with which to study the characteristics of various gate pocket/rotor vane ratios. FIG. 3 allows the viewer to maintain a constant perspective of a gate pocket while observing the passage of a rotor vane with respect to rotational position. The example shown is the FIGS. 2A-2F example of 2 gate pocket/4 rotor vane configuration with the gate rotational velocity being twice the rotor rotational velocity. It would appear, from examination of FIG. 3, that fluid turbulence is relatively minimal in the pocket (especially compared to lobed or external gate designs), and indeed it is. However, further examination reveals that there are some compression/suction cycles even with a good basic entry and exit of the vane in a gate pocket. In FIG. 3, three points between the gate pocket 32 and vane 14 are fluid orifices (obstructions to fluid flow); point 37 on the entry side of the pocket 32, point 38 on the bottom of the pocket 32, and point 39 on the exit side of the pocket 32. It has been found in current embodiments of rotary meters that these orifices have some minimal area at which any smaller area starts to reduce meter performance; obviously, there is fluid flow through these orifices. If FIG. 3 is examined from that portion starting with the vane 14 at the FIG. 2B position to the FIG. 2D position, the reason becomes clear. FIG. 4 shows the FIG. 2B position of FIG. 3 crosshatched with an area of fluid 36 dotted.

Figure 5:
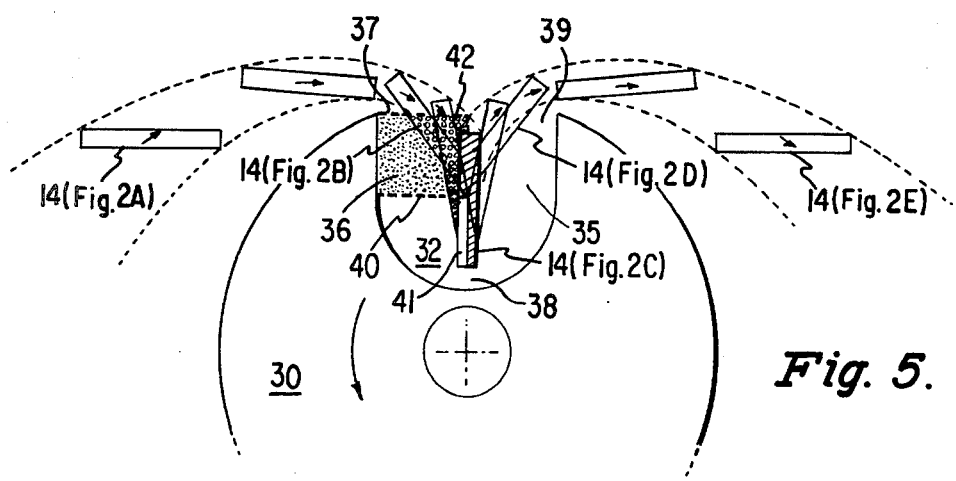

FIG. 5 shows the FIG. 2C position of FIG. 3 crosshatched with the same area of fluid 36 dotted. In FIG. 5, the vane 14 (at FIG. 2C crosshatched) has now completely entered the pocket 32. The entry of the vane 14 displaced some fluid (that area of the vane under the line 40) and it can be presumed that half of the displaced fluid went to either side of the vane 14. That portion of the fluid displaced by the vane 14 pertinent to the discussion is 41 (it causes a compression to area 36). However, the vane 14 has vacated an area 42 (shown as joined circles) which is a suction to area 36. Area 42 (the suction) is larger than area 41 (the compression) so the net effect is a suction on area 36. Similarly, as the vane 14 leaves the pocket 32, there is a compression of fluid in the area 35. As a result of such compression/suction in the pocket 32, there is fluid flow into the orifice 37 (to fill area 36), through the orifice 38 from area 36 to 35, and out of orifice 39. Thus it can be observed that the width of the gate pocket 32 and orifice 38 are critical design parameters.

Figure 6:
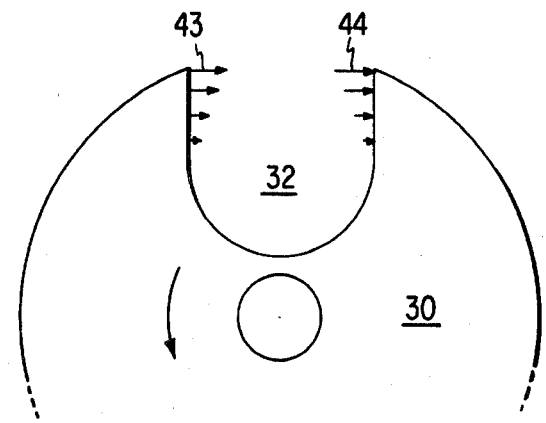
FIG. 6 illustrates the compression/suction forces acting on the gate due to passage of a vane through a pocket.

It should now be recalled that the rotor 10 is the driving force in a meter (due to pressure differential from inlet to outlet). The rotor 10, through some driving mechanism (like gears) causes the gate 30 to be driven. While the drive to the gate 30 is a modest torque, it should be noted that it is through a 200% speed increaser (for a 2 pocket gate, 4 vane rotor); which more than doubles the required torque from the rotor 10 to drive the gate 30. It is more than double the torque because gear train and bearing friction increase with rotational velocity. Now, consider the effect of the compression/suction effects due to the vane 14 passing through the gate pocket 32. FIG. 6 shows a diagram of resultant forces. It can be seen in FIG. 6 that the suction effect of vane entry to the pocket results in a retarding force 43 which is a counter torque to the gate drive. Similarly, the compression effect of vane exit from the pocket results in a retarding force 44 which is a counter torque to the gate drive. Thus, in a 2 pocket gate/4 vane rotor there are four sets of retarding cycles per revolution of the rotor, and this is through a 200% speed increaser. The result of this effect lowers the performance in rangeability, makes it tend to "droop" in accuracy at higher velocities, and makes it more sensitive to fluid density effects at higher pressures.

Such a 2 pocket/4 vane rotor arrangement can also be observed to have, of the possible available combinations of gate/rotor ratios, the one of the higher gate rotational velocities which results in higher gate drive train frictions, higher gate bearing rotational velocities and resultant friction (which also lowers bearing life), and has higher rotational element inertia (if the mass and diameters of components are identical).

It therefore becomes desirable to reduce the relative gate rotational velocity if the action of the vane entry/exit does not result in additional compression/suction forces acting against the gate rotational direction. The resultant torque requirements on the rotor would be reduced in proportion to the reduction in speed increase of the gate, the gate drive and bearing friction would be reduced in an even greater amount, and the system inertia would be lowered.

Figure 7:
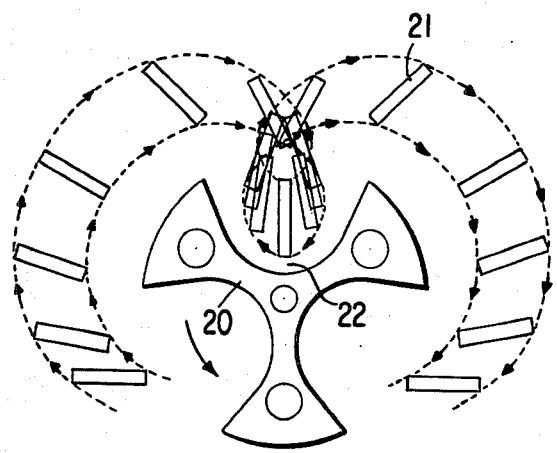
FIG. 7 illustrates the travel of a vane through a pocket for a 3 pocket/4 vane configuration.

Using the type of visual tool shown in FIGS. 3-5, consider Butcher's (U.S. Pat. No. 3,950,990) invention of the ratio of 3 gate pockets to 4 rotor vanes, where the rotational velocity of the gate is reduced to 133% of the rotor. FIG. 7 uses the technique of FIGS. 3-5 to show the characteristics of vane entry/exit to a gate pocket. It can be observed in FIG. 7 that the vane entry/exit is not like the FIG. 3 example. In FIG. 7, the vane 21 has a higher angle of attack to the gate pocket 22. The vane 21 when in the pocket 22 now moves laterally in the direction of rotation of the gate 20 (compression/suction forces now push the gate 20 in its direction of rotation), and the vane 21 exit is higher to the gate 20 periphery. Gate 20 rotational velocity has been substantially lowered (and thus gate gear train torque, bearing friction, and inertia have also been lowered).

It should be noted that the characteristic retarding action (due to compression/suction effects) of a 2 gate pocket/4 vane rotor converts towards the characteristics of FIG. 7 (aiding action) at the configuration of 3 gate pocket/5 vane rotor (gate velocity 166% of rotor velocity) and all lower ratios exhibit (in proportion to the difference in relative velocities) the characteristics of aiding action as in FIG. 7. For instance, Wrinkle's 2 gate pocket/3 rotor vane design (U.S. Pat. No. 3,482,446), which has a gate rotational velocity 150% of the rotor, exhibits similar characteristics (of aiding gate rotation) to a lesser degree. In fact, it is not the claimed "reduced turbulence" that improves FIG. 7 type meter performance (because turbulence is actually higher in FIG. 7 than in FIG. 3), but rather it is a combination of the aiding action of the vanes in rotating the gate, the lower gate drive gear train friction, and the lower gate bearing friction.

Figure 8:
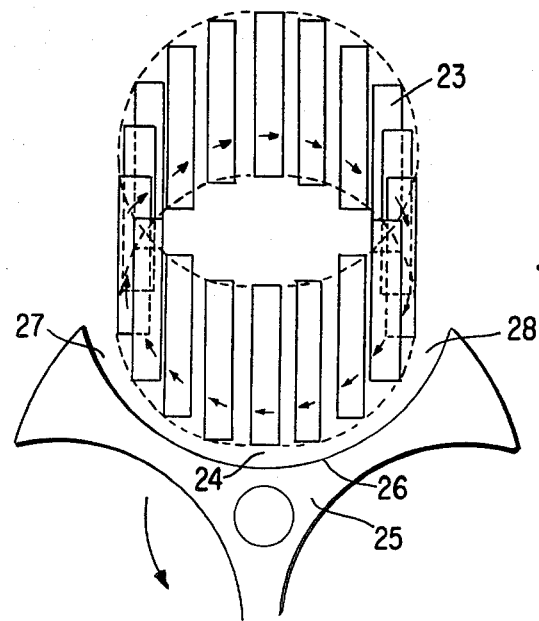
FIG. 8 illustrates the travel of a vane through a pocket for a 3 pocket/3 vane configuration.

It is logical to surmise that an even lower ratio of gate to rotor rotational velocities might further enhance meter performance; and indeed it does (contrary to Wrinkle's observation in U.S. Pat. No. 3,483,446). The lowest practical ratio of gate to rotor rotational velocities is 1:1 (any combination of two or more gate pockets with a like amount of rotor vanes). At this ratio, the gate drive train has no speed increase factor and the gate velocity is the same as the rotor (lowest gate gear train and bearing friction). At this ratio, however, the approach of the vane to the pocket is unique compared to all other ratios as the vane approaches from the opposite direction to the gate pocket. FIG. 8 illustrates this point using the visualization technique of FIG. 3. It can be observed from FIG. 8 that the passage of the vane 23 through the gate pocket 24 is at an even higher relative velocity than in FIG. 7 and therefore has the highest aiding forces to the rotation of the gate 25.

Considerable experimentation with 1:1 gate pocket to rotor vane ratios compared to other ratios has demonstrated that this is the preferred ratio over all others considering the criteria of lowest impediments to fluid flow. It has been determined that at this 1:1 ratio it is uniquely possible to overdrive the gate (as retarded by gate gear train drive friction and gate bearing friction) such that it is possible, through experimentation, to balance the gate retarding forces of gear train and bearing friction to the aiding forces of the vane passage through the gate pocket so as to minimize the gear train (or any other drive mechanism) friction component. The "balancing" of torque forces is accomplished by controlling the vane inner diameter so as to provide an inner vane tip orifice 26 (FIG. 8) which allows sufficient fluid to pass from the compressed side of the vane (see area 27 in FIG. 8) to the suction side of the vane (see area 28 in FIG. 8). Experimentation has disclosed that balancing of torque forces should be at full meter capacity. Gas density and/or rotational velocity does not seem to affect this balancing technique. Further, because the gate bearing friction is also minimized by being at the lowest possible rotational velocity (compared to the rotor rotational velocity), this friction component is also relatively minimized. The result is minimum requirements of gate driving torque from the rotor and therefore minimum pressure differential from inlet to outlet to drive rotational components. Deviations in higher flow rate inaccuracy due to friction is minimized, and rangeability is improved due to lowered differential across the seals in addition to lower friction at the lower flow rates. There are no compression nodes (see FIG. 1, point D) with this ratio.

An additional benefit of this 1:1 ratio is that other types of gate driving mechanism (than gear trains) are possible. Another benefit is that the inertia of rotating elements is minimized (for rotating elements of the same diameter and mass). Reduction in rotating component inertia allows the meter to be more responsive to changes in fluid flow rate, improves measured accuracy during a change in flow rate (lower inertia reduces the pressure differential across the rotating elements which reduces seal blowby), reduces mechanical strain on components due to sudden, major changes in flow rate, reduces the mechanical strain on the gate drive train, and reduces the overrun/reverse characteristics of rotary meters which occurs when the flow rate is quickly reduced (such as the reduction of a burner to a pilot flame) which can extinguish ("suck-out") a pilot. Another benefit is that bearing velocity of the gate components is reduced so that bearing life is improved.

A 1:1 ratio of gate and rotor rotational velocities, in itself, is not a new invention (see Loverridge's U.S. Pat. No. 1,994,397). What is unique is the balancing of torque forces of rotational friction against the driving forces of the vane passage to minimize the effects of friction. Loverridge's patent clearly has considerable overdriving by the vane as the vane inner tip orifice is very small as well as the fluid medium being liquid (in addition, there is no mention of balancing drive torque against friction torque).

In summary, in order to mitigate compression/suction characteristics of internal gate vane-type rotary meters, the preferred embodiment should have a 1:1 gate to rotor rotational velocity ratio of at least 2 gate pockets/2 rotor vanes where the aiding forces of the vane passage through the gate pocket is balanced (by trimming the vane inner diameter to provide the desired orifice 26) against the forces of the gate drive friction and gate bearing friction. Proper dimensions of the orifice 26 are obtained through empirical testing, since different sized meters have different bearings, etc., which results in different retarding forces. Additional benefits of this lowest practical ratio are lowest gate drive friction, lowest gate bearing friction, and lowest inertia of rotating components (for a given diameter and mass of rotating components). The effect on meter performance is to improve and stabilize accuracy over wide flow rates and to reduce pressure differential (which improves capacity) and to improve rangeability.

Another consideration is rotor, gate, and cresent geometry. For any geometry, it is desirable to maximize the meter capacity for a given rotor diameter in order to minimize rotating component rotational velocity for the purpose of minimizing gate timing drive friction, gate bearing friction, and rotor bearing friction. By minimizing rotational velocity friction, inaccuracies due to variable friction are minimized and rangeability is improved (increase in ratio). The objective in selecting geometry is therefore to minimize component rotational velocity.

As explained above, the capacity per revolution of a rotary vane meter is the swept area of a rotor vane in one revolution. For FIG. 9, if the vane 46 outer diameter is $D_r$, the vane 46 inner diameter is $D_i$, and the vane 46 length is $L_v$, then the swept volume (or capacity) V in one revolution is a cylinder having a volume as follows:

$$[(D_r)^2\pi/4 - (D_i)^2\pi/4]L_v = V$$

Since, by definition, the volume per revolution V is to be maximized for a given rotor vane outer diameter $D_r$ and vane length $L_v$, the only variable is the vane inner diameter $D_i$. $D_i$ must therefore be minimized to increase V (and therefore reduce rotational velocity of rotating components).

Figure 10:
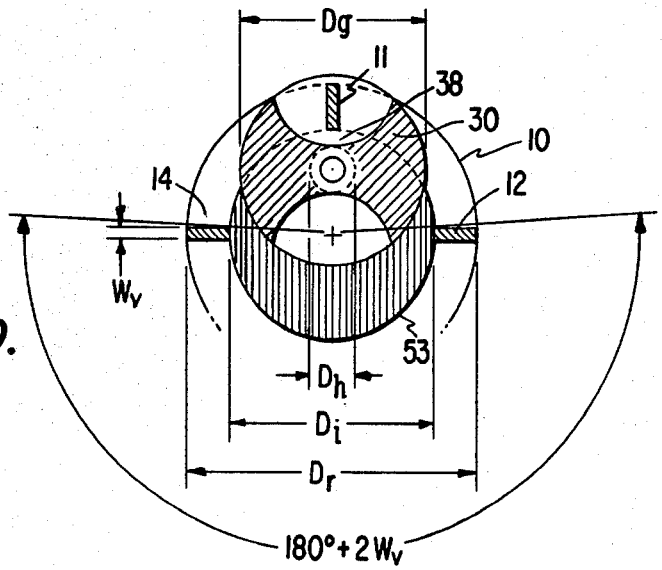
FIG. 10 illustrates the dimensions of the configuration shown in FIGS. 2A–2F.

$D_i$ has some constraints to reducing its diameter. In FIG. 10, one major constraint is that the gate bearing hub diameter $D_h$ must be inside the vane inner diameter $D_i$ so that the vane 11 can pass the gate 30. Another major constraint is that the gate hub must have a vane inner tip orifice 38 for balancing vane driving torque to friction (as previously discussed).

Figure 11:
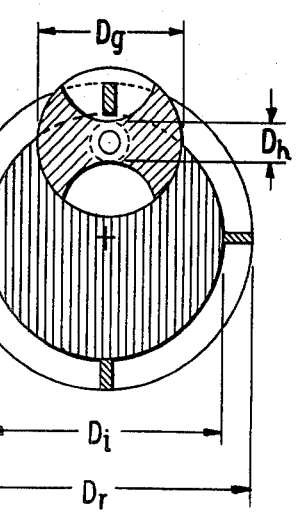
FIG. 11 illustrates a modification to FIG. 10.
Figure 12:
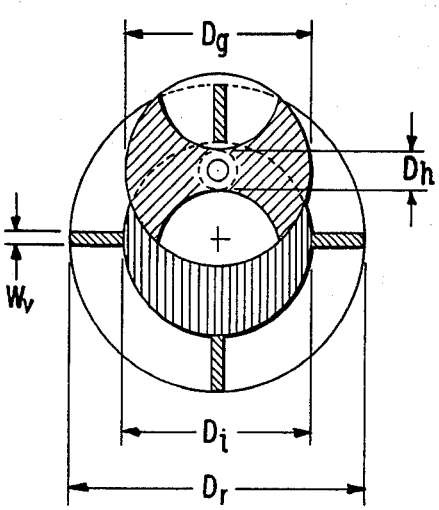
FIG. 12 illustrates a further modification to FIG. 10.

An observation that has not been missed in all previous patents, however, is that capacity per revolution (V in FIG. 9) can be maximized for a given rotor diameter $D_r$ and vane length ($L_v$ in FIG. 9) if the vane inner diameter $D_i$ is minimized by increasing the gate to its maximum diameter $D_g$ (which still seals). FIGS. 11 and 12 demonstrate the effect of $D_i$ if the gate diameter $D_g$ is maximized (within its constraints).

It can be observed that maximizing the gate diameter $D_g$ decreases the vane inner diameter $D_i$ in FIG. 12 compared to FIG. 11. The fact that a better gate drive would allow the gate diameter $D_g$ to get larger and overlap the rotor centerline was the essence of Wrinkle's U.S. Pat. No. 3,482,446. However, no patent for an internal gate vane-type rotary meter has ever had a crescent 53 where the arc is less than 180° plus 2 vane widths $W_v$ at the diameter $D_i$ (see FIG. 10) even when more than two vanes (i.e., vanes 12 and 14 in FIG. 10) were on the rotor 10.

Where there are three or more vanes on the rotor, it is possible to further increase the gate diameter $D_g$ such that the capacity per rotor revolution is increased, thus reducing rotating component velocity so as to reduce rotating friction, resulting in improved meter performance.

Figures 13A, 13B:
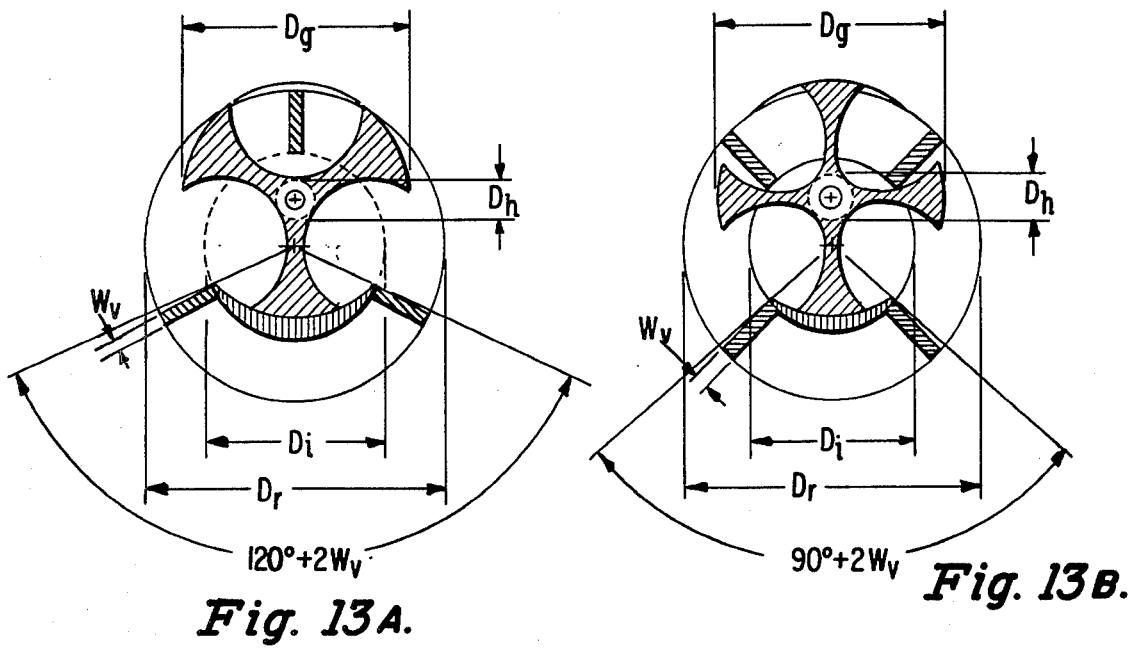
FIGS. 13A and 13B illustrate 3 and 4 vane rotors, respectively, with equal numbers of pockets, in which the swept volume is maximized.

FIG. 13A shows a 3 vane rotor and FIG. 13B shows a 4 vane rotor which have an increased gate diameter $D_g$ which still seals appropriately. It can be observed in FIGS. 13A and 13B that for the identical rotor diameter $D_r$ in FIGS. 10-12, increasing the gate diameter $D_g$ to the maximum (which still affords sealing) by reducing the crescent to its minimum sealing requirement reduces the rotor vane inner diameter $D_i$ to its minimum value. This, in turn, maximizes the volume V for a given rotor outer diameter $D_r$ and vane length $L_v$. By maximizing the volume V per revolution in a rotary meter, for a given capacity (or volume) this minimizes the rotational velocities of the gate drive, rotor and gate. By reducing rotating component velocity, gate drive and bearing friction is minimized (velocity, thus friction, is reduced in proportion to the decrease in the rotor vane inner diameter $D_i$). The reduction in rotating component friction is in the order of 15% from the geometry of FIG. 12 to the geometry of FIG. 13A or 13B.

This reduction in friction improves meter performance; variances in accuracy due to friction are reduced, pressure differential to drive the rotor is reduced (thus capacity rating is increased), and rangeability can be improved both due to lower rotating friction as well as lower driving pressure differential. The rotating inertia is reduced in proportion to rotating velocity for the rotor, and to a lesser degree for the gate (as it is a larger diameter). This improves meter response during changes in flow rate.

In summary, in order to reduce rotating velocity for the purpose of reducing rotating friction to improve meter accuracy, and in order to reduce rotating inertia for the purpose of improving meter response and accuracy during changes in flow rate, an internal gate vane-type rotary meter should be designed to maximize the gate diameter. It is possible to maximize the gate diameter by reducing the crescent sealing arc to:

$$\frac{360°}{N} + \frac{2W_v \, 360°}{\pi D_i} = \text{crescent sealing arc}$$

Where:
N = number of rotor vanes;
$W_v$ = width of the vane at its inner circumference; and
$D_i$ = vane inner diameter.

It should be noted that due to 1:1 gate to rotor rotational velocity ratio considerations (for friction torque balancing), the 3 pocket gate/3 rotor vane configuration of FIG. 13A is the preferred embodiment.

Figure 9:
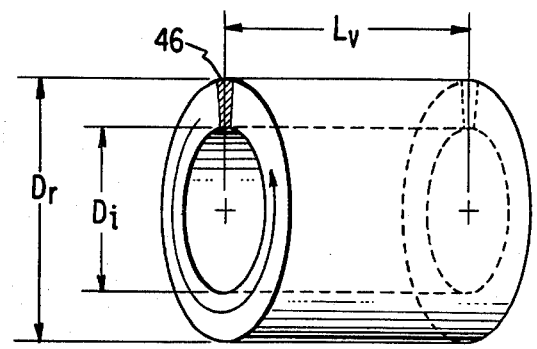
FIG. 9 illustrates the volume swept by a vane in one revolution.
Figures 14A, 14B:
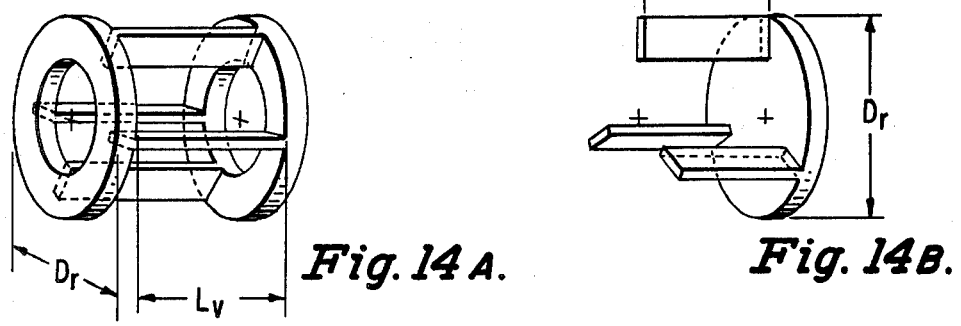
FIGS. 14A, 14B and 14C illustrate, respectively, a double ended rotor and two cantilevered vane rotor, having different vane aspect ratios.

A further consideration is the rotor vane length ($L_v$ in FIG. 9). It has been the practice in rotary meter design to maximize the length of vanes (length parallel to the axis of rotor rotation) within the constraints of mechanical construction. For instance, contemporary 4 vaned rotors with a rotor end plate on both ends have a vane length $L_v$ to rotor diameter $D_r$ ratio of 1:1. Contemporary 3 vaned rotors with cantilevered vanes from one rotor end plate have a vane length $L_v$ to rotor diameter $D_r$ ratio of 1:2. These constructions are illustrated in FIGS. 14A and 14B, respectively.

Figures 15A, 15B:
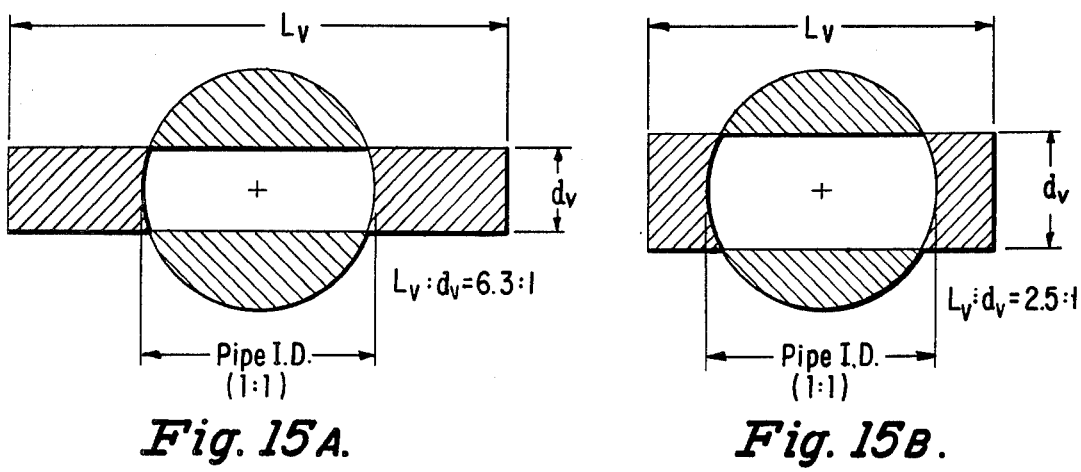
FIGS. 15A, 15B and 15C illustrate the area differences between inlet/outlet piping and vanes for the constructions of FIGS. 14A, 14B and 14C, respectively.

The purpose of utilizing such long vanes, of course, is to reduce rotational velocity (to reduce friction) of rotating components for a given capacity at a given rotor diameter $D_r$. However, experimentation has shown that the vane shape, length $L_v$ to depth $d_v$ (where $d_v = (D_r - D_i)/2$), or aspect ratio, is significantly affected in various configurations due to fluid dynamic considerations. The fluid entering and leaving the meter has the circular cross section of the piping (aspect ratio of 1:1). If the vane has an aspect ratio of 6.3:1 ($L_v:d_v$), as is typical of contemporary 4 vaned rotors with a rotor end plate on both ends (FIG. 14A), the fluid must go from a 1:1 (circle) ratio to a 6.3:1 ratio and then back to a 1:1 ratio within the meter. Such fluid contortions can result in significant fluid dynamic losses (due to the sudden change in fluid velocity and direction). Even the cantilevered, 3 vaned rotor (FIG. 14B) has an aspect ratio of 2.5:1 ($L_v:d_v$) resulting in measurable fluid dynamic losses. It should be noted that lobed type rotory meters have similar aspect ratios, so the issue is not limited to vane-type meters. FIGS. 15A and 15B graphically illustrates this aspect ratio issue.

Figure 14C:
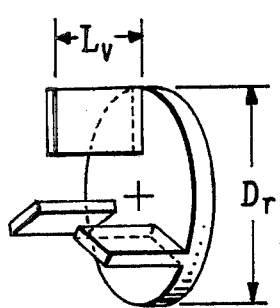
Figure 15C:
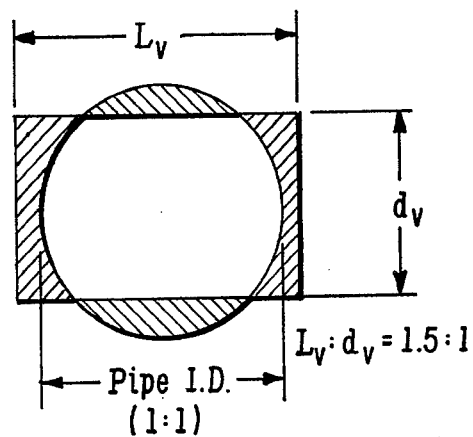

The preceding consideration of minimizing the vane inner diameter $D_i$, which lowers the aspect ratio by increasing the vane depth $d_v$, tends to mitigate these adverse fluid dynamic effects. The 4 vane 6.3:1 aspect ratio is reduced to approximately 5.3:1 and the 3 vane 2.5:1 aspect ratio is reduced to approximately 2.1:1. According to this invention, it has been found to be advantageous not to exceed a ratio of 1.5:1 ($L_v:d_v$) to minimize such aspect ratio fluid dynamic effects. FIG. 14C illustrates a cantilevered three vaned rotor having an aspect ratio of 1.5:1 ($L_v:d_v$) and FIG. 15C illustrates the improvement, over the examples of FIGS. 15A and 15B, that the decreased vane aspect ratio has on reducing fluid dynamic effects.

Such fluid dynamic effects are proportional to fluid mass; thus the adverse effects of a higher aspect ratio is more pronounced at higher (i.e., capacity) flow rates and when the fluid's mass increases (i.e., at higher pressures for gaseous fluids). Thus, another reason to limit the aspect ratio is to minimize effects of gas density.

Another effect of limiting the aspect ratio is that increasing the rotor diameter to compensate for reduced vane length results in improved volumetric efficiency (the ratio of the swept volume to the volume occupied by the mechanism), because as shown in FIG. 9, the swept volume is related to the second power of the diameter ($D^2$) but only to the first power of the vane length ($L_v$); this allows a lower rotational velocity of the rotor. As previously observed, slowing component rotational velocity reduces rotating friction proportionately. It should be noted, however, that rotational inertia is reduced in proportion to the lower rotational velocity but increased due to the outward movement of rotating component mass (rotating component design must attempt to minimize mass towards the component periphery).

Another effect of limiting the aspect ratio by increasing the rotor diameter and shortening rotor vanes is that the starting torque is increased in proportion to the increase in diameter of the rotor (the force, pressure differential, of liquid against the rotor vane has a larger moment arm around the rotor centerline). This increase in starting torque is highly beneficial to rangeability as the rotating components more readily overcome tare friction of gate drive and bearings allowing the rotor to more nearly match the velocity of the measured fluid at low flow rates (which are also at very low pressure differentials). This additional torque is also very beneficial in driving devices powered by a rotor (such as mechanical volume correctors).

Thus, according to this invention, to reduce fluid dynamic losses due to high aspect ratios, to reduce rotating component velocity to reduce rotating component friction, and to improve start-up torque for better rangeability and ability to drive volume correcting devices, it is desirable to limit the vane aspect ratio to 1.5:1. The effect on meter performance is to improve accuracy, particularly at full capacity, to improve rangeability, and to reduce potential adverse effects of gas density due to pressure.

Figure 16:
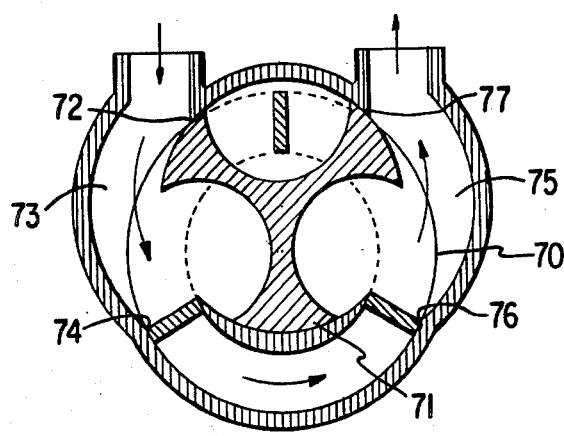
FIG. 16 illustrates the flow through a 3 vane/3 pocket meter.

Yet another consideration is the shaping of the conduits from the inlet pipe to the rotating elements and then to the exit pipe. Internal gate vane-type rotary meters ideally should have "U" shaped flow as shown in FIG. 16. For those unfamiliar with the characteristics of internal gate vane-type rotary meters, the fluid inlet must feed the gate 71 seal point 72 (or there will be a retarding suction at point 72), must have an inlet chamber 73 which curvingly tapers from full inlet area at the entrance to zero area at the vane seal point 74 where one leg of the curving taper is the rotor 70 outside diameter (this shape being required in order to eliminate compression/suction cycles as a function of gate 71 rotation since the gate seal, or outside gate diameter, is a flow block when in the inlet chamber 73), must also have an outlet chamber 75 which curvingly tapers from zero area at the vane seal point 76 to full outlet area at the exit (the same compression/suction cycle occurs as with the inlet), and must feed the gate 71 seal point 77 (or there will be a retarding compression at point 77) before exiting the meter.

Figure 17:
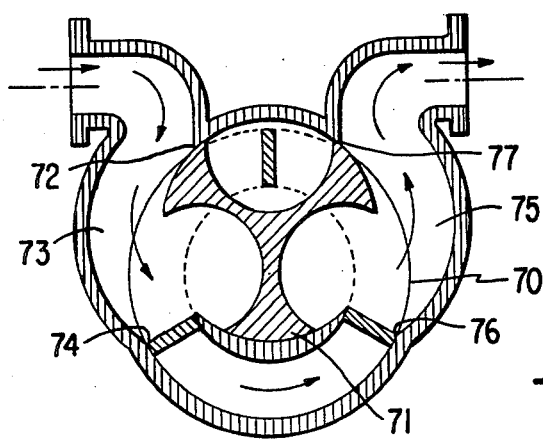
FIG. 17 shows a typical connection to a pipe run of the meter shown in FIG. 16.

Unfortunately for rotary meters, however, such meters are generally placed in a pipe run such that it is conventional to provide inlet and outlet turning conduits to couple to such pipe runs; FIG. 17 shows a typical method. The problem with the method shown in FIG. 17, however, is that fluids tend (due to their mass) to continue in the same direction and velocity as their initial direction and velocity in the entrance pipe or as exiting the meter outlet chamber 75. Thus, there are considerable pressure losses in the requirement to make a turn and the sharper the turn, the higher the pressure losses rise, in an exponential manner. The sharp inlet/outlet turns of FIG. 17 are necessary for properly directing the fluid flow to the rotating elements and aligning the fluid for the pipe run, but the sharp turns result in very high losses which substantially increase the necessary pressure differential just to go through the housing 78. However, as previously discussed (see FIG. 1 and the discussion thereof), pressure differential is one of the parameters of meter rating.

Figure 18:
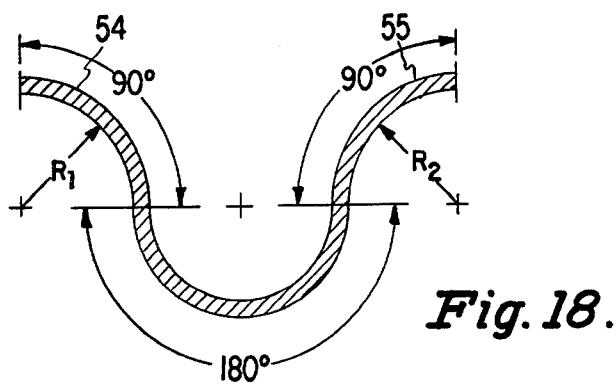
FIG. 18 schematically shows the flow through the meter of FIG. 17.

Those skilled in the art are aware of such fluid dynamic considerations in varying degrees. If in-line piping is required, the fluid path into the meter should turn as gradually as possible (no sharp turns), should not be directed at the gate so as to retard it, and should be directed so as to impinge the vanes perpendicularly. Since all internal gate devices until now have had at least 180° crescents (see FIGS. 10-12), proper flow path required a 360° fluid turn path for in-line piping. FIG. 18 shows this schematically. In the schematic FIG. 18, (and referring to FIG. 17), it can be seen that the fluid path must turn 360° for in-line piping, that the inside radii $R_1$ and $R_2$ should be as gentle as possible, that the means of increasing rotor diameter disclosed herein are beneficial in making the 180° turn more gentle, and that the conduits 54 and 55 direct the fluid perpendicular to the vanes (and not at the gate).

Figure 19A:
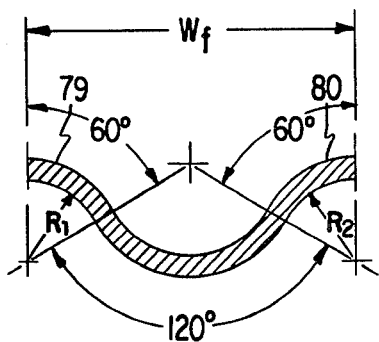
FIGS. 19A and 19B schematically show the flow through the meters of FIGS. 13A and 13B, respectively.
Figure 19B:
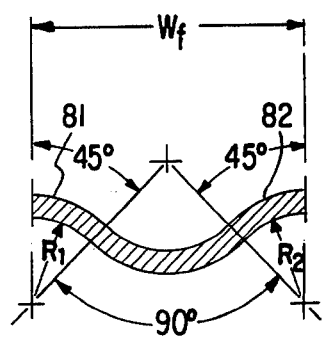

The construction disclosed herein of utilizing a crescent with less than a 180° arc (see FIGS. 13A and 13B), however, allows a different approach to the problem; the fluid can be directed perpendicular to the vane at a much more advantageous point which reduces the amount of turning within the meter with in-line piping to as little as 180° (instead of 360°). FIGS. 19A and 19B disclose this principle.

In can be observed in FIGS. 19A and 19B that the amount of fluid turning can be substantially reduced depending on the number of vanes on the rotor; from 360° arc to 240° arc for a 3 vane rotor (FIG. 19A), and from 360° arc to 180° arc for a 4 vane rotor (FIG. 19B). Further, the radius $R_1$ for the inlet conduits 79, 81 and the radius $R_2$ for the outlet conduits 80, 82 can be made larger (more gentle turn) without significantly increasing the flange-to-flange dimension $W_f$. The result of this approach is to significantly lower the differential pressure required to pass fluid through the housing (without rotating elements). Benefits are higher capacity rating for a given pipe size and reduction in gaseous fluid density effects as might occur with higher pressures.

In a practical housing design, however, certain compromises must be made. First, the preferred embodiment is a 3 vane rotor (due to the geometry of rotating elements in a 1:1 ratio of gate to rotor rotational velocities with a maximized gate diameter and balanced torque orifice as herein described). Second, the suction and compression points next to the gate (points 72 and 77 in FIGS. 16 and 17) are significantly detached from the fluid flow as shown in FIGS. 19A and 19B but absolutely require fluid flow. Third, the tapered fluid inlet and outlet chambers (points 73 and 75 in FIGS. 16 and 17) are required for proper fluid feed and exit to gate and rotor. Thus, a practical housing design must attempt to satisfy all of these requirements while attempting to take advantage of the principles illustrated in FIGS. 19A and 19B.

An additional requirement worth mentioning is that fluid dynamic losses will increase if fluid velocity is changed, so it is also a requirement of housing design to maintain the same fluid velocity from the inlet piping, through the inlet conduit, measurement area, and outlet conduit to the outlet piping. This requirement results in maintaining a constant cross-sectional area of the fluid through the meter.

Figure 20:
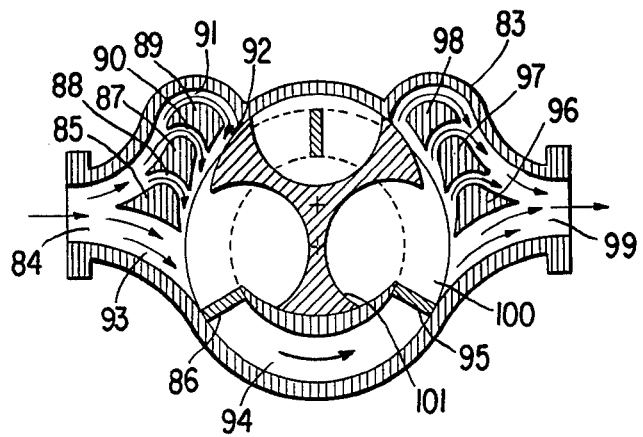
FIG. 20 illustrates a preferred housing and gate/rotor configuration.

Through considerable experimentation with performance and "bubble" tests, it has been determined that the general housing configuration of FIG. 20 meets the requirements with minimized pressure loss due to fluid dynamic considerations.

In FIG. 20, a "practical" meter housing 83 is shown which minimizes pressure differential losses due to fluid dynamic considerations of turning and changes in velocity. In this meter, the rotor 100 and gate 101 are mounted on the housing 83 for rotation about parallel displaced axes. If the inlet pipe fluid flow and cross-sectional area is considered to be 100%, then chamber 84 also is 100% (but can be used to convert from the circular pipe inner diameter to rectangular shape as a transition). Turning vane 85 splits the 100% into the fluid flow requirement behind the turning vanes at the rotor (the tapered inlet chamber 73 of FIG. 17) which, for this example, will be 30% of the flow of 84, and the other 70% goes directly to the vane 86 to impinge on it perpendicular to the vane face when the vane is sealing the measurement area 94 (thus making 70% of the inlet flow act as in FIG. 19A). Turning vane 87 takes the 30% flow and directs 10% through conduit 88 to feed the tapered chamber area behind turning vane 85, and directs the remaining 20% fluid flow to turning vane 89. Turning vane 89 takes the 20% flow and directs 10% through conduit 90 to feed the tapered chamber area behind turning vane 87, and directs the other 10% through conduit 91 to feed the tapered chamber area behind turning vane 89 (thus feeding the suction point 92). All of the various conduits, 93, 88, 90 and 91 combine at the vane 86; 70% by direct feed as in FIG. 19A and 30% by the tapered chamber notion of FIG. 17 behind each turning vane 85, 87 and 89. The 100% now goes through the measurement area 94 to vane 95; and goes through the reverse flow splitting around turning vanes 96, 97 and 98 until recombined in the exit chamber 99 (which can be used to convert from rectangular to circular shape to enter the exit pipe).

In actual practice, the above example is modified in order to position the meter housing to the pipe run centerline, in order to compensate for fluid dynamic "edge effect", and other considerations. The basic concept of feeding most of the fluid as in FIG. 19A, however, is quite valid. Pressure differential losses due to the fluid dynamics of changing direction and velocity, and impinging properly on rotating components is definitely and substantially reduced.

The result to performance is improved accuracy (particularly at full capacity) and reduced aberrations of accuracy due to gaseous fluid density (as at higher operating pressures).

In summary, there has been disclosed a housing configuration for in-line piping of conduits and turning vanes structured to fulfill the fluid feeding requirements at the rotor while directing most of the fluid flow through gently curving conduits which reduce the typical 360° arc of fluid flow through the meter to 240° of arc thus improving accuracy at high flow rates and/or at higher operating pressures. The reduced crescent (under 180° of arc) is a prerequisite to this design.

Accordingly, there has been disclosed an internal gate vane-type rotary meter with:

(1) a 1:1 rotational velocity ratio of gate and rotor tuned to minimize gate drive and bearing torque by controlling the rotor vane inner diameter;

(2) a gate which is maximized in diameter by reducing the sealing crescent to the minimum arc required to seal two adjacent vanes;

(3) a vane length with an aspect ratio not exceeding a 1.5:1 ratio of vane length to vane depth;

(4) a body configured with inlet and outlet passages to minimize fluid dynamic losses for a meter installed within in-line piping; and (5) a body configured with passages whose total cross-sectional area on the inlet or outlet side substantially equals the area of the vane (length times depth).

It is understood that the above-described arrangement is merely illustrative of the application of the principles of this invention. Numerous other arrangements may be devised by thosed skilled in the art without departing from the spirit and scope of this invention, as defined by the appended claims.

I claim:

1. In a fluid meter, the combination of a body having an inlet passage and an outlet passage, a crescent shaped member within the body defining therewith an arcuate channel communicating at opposite ends with said passages, respectively, said body and said crescent also defining an offset circular cavity intersecting the channel between the inlet and outlet passages, a rotor mounted on the body for rotation about an axis within the arcuate channel and the offset cavity, said rotor having at least one end plate with a plurality of vanes fixed to said at least one end plate, said vanes being adapted to move by fluid pressure through said arcuate channel and through said portion of said cavity, a gate mounted on the body for rotation about an axis parallel to the rotor axis within said offset cavity, said gate having a periphery provided with pockets therein for reception of the rotor vanes, the number of gate pockets not exceeding the number of rotor vanes, said gate having webs extending radially outward from a central hub between adjacent pockets, means for coupling said rotor to said gate to synchronize the passage of rotor vanes through gate pockets without the vanes contacting the gate webs, said coupling means providing a drive train for gate rotation from the rotor, said vanes being dimensioned to each have a length from said at least one end plate parallel to said rotor axis which does not exceed 1.5 times the width of said each vane as measured from the vane outer radius to the vane inner radius in a direction perpendicular to said rotor axis.

* * * * *